(12) United States Patent
Konno et al.

(10) Patent No.: US 9,244,721 B2
(45) Date of Patent: Jan. 26, 2016

(54) COMPUTER SYSTEM AND DIVIDED JOB PROCESSING METHOD AND PROGRAM

(75) Inventors: Kazuya Konno, Tokyo (JP); Kazuhiko Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 14/360,429

(22) PCT Filed: Nov. 24, 2011

(86) PCT No.: PCT/JP2011/006549
§ 371 (c)(1),
(2), (4) Date: May 23, 2014

(87) PCT Pub. No.: WO2013/076775
PCT Pub. Date: May 30, 2013

(65) Prior Publication Data
US 2014/0317635 A1    Oct. 23, 2014

(51) Int. Cl.
G06F 9/46    (2006.01)
G06F 9/50    (2006.01)

(52) U.S. Cl.
CPC . *G06F 9/46* (2013.01); *G06F 9/505* (2013.01)

(58) Field of Classification Search
None
See application file for complete search history.

(56) References Cited

U.S. PATENT DOCUMENTS

| | | |
|---|---|---|
| 4,495,562 A | 1/1985 | Yamaji et al. |
| 7,650,331 B1 | 1/2010 | Dean et al. |
| 7,954,104 B2 | 5/2011 | Amaki et al. |
| 2005/0010608 A1 | 1/2005 | Horikawa |
| 2006/0015875 A1 | 1/2006 | Ishihara et al. |
| 2006/0206900 A1* | 9/2006 | Ooyama et al. ............. 718/105 |
| 2011/0131579 A1 | 6/2011 | Tsukamoto et al. |

FOREIGN PATENT DOCUMENTS

| | | |
|---|---|---|
| JP | 57-000757 A | 1/1982 |
| JP | 03-262074 | 11/1991 |
| JP | 11-232232 | 8/1999 |
| JP | 2005-31771 A | 2/2005 |
| JP | 2007-150409 A | 6/2007 |
| JP | 2011-028464 A | 2/2011 |
| WO | WO 2004/086246 A1 | 10/2004 |

OTHER PUBLICATIONS

PCT International Search Report on application PCT/JP2011/006549 mailed Feb. 7, 2012; 11 pages.

* cited by examiner

*Primary Examiner* — Craig Dorais
(74) *Attorney, Agent, or Firm* — Foley & Lardner LLP

(57) ABSTRACT

Each execution computer measures a load on each execution computer, generates a job request including information about the number of executable divided jobs based on the measured load, and sends the generated job request to a management computer which manages each execution computer. The management computer receives the job request and assigns as many divided jobs as the number of divided jobs designated by the job request to each execution computer.

13 Claims, 20 Drawing Sheets

FIG.2

| GRID JOB NAME | NUMBER OF DIVISIONS | DIVISION JOB NAME | PROGRAM NAME | DIVIDED DATA | SCHEDULED TERMINATION TIME | SCHEDULE STATUS |
|---|---|---|---|---|---|---|
| GRID JOB A | 100 | JOB 1 | PROGRAM A | DATA 1 | 2011/8/2 12:10:15 | TRUE |
| | | JOB 2 | PROGRAM A | DATA 2 | 2011/8/2 12:10:15 | RUN |
| | | JOB 3 | PROGRAM A | DATA 3 | — | FALSE |
| | | : | : | : | : | : |

| EXECUTION COMPUTER NAME | NUMBER OF REQUESTED DIVISION JOBS | THROUGHPUT VALUE | NUMBER OF EXECUTED JOBS | SCHEDULED TIME (SEC) |
|---|---|---|---|---|
| EXECUTION COMPUTER A | 3 | 6 | 3 | 5 |
| EXECUTION COMPUTER B | 2 | 2 | 2 | 10 |
| EXECUTION COMPUTER C | 2 | 4 | 2 | 15 |

FIG.4

| DISTRIBUTING EXECUTION COMPUTER NAME | PROGRAM NAME | DIVIDED DATA |
|---|---|---|
| EXECUTION COMPUTER A | PROGRAM A | DATA 3, DATA 4, DATA 5 |
| EXECUTION COMPUTER B | PROGRAM A | DATA 6, DATA 7 |
| EXECUTION COMPUTER C | PROGRAM A | DATA 8, DATA 9 |

FIG.5

| JOB ID | DIVISION JOB NAME | JOB TERMINATION TIME |
|---|---|---|
| 1 | JOB 2 | 2011/8/2 12:10:11 |
| 2 | JOB 4 | 2011/8/3 12:10:12 |
| 3 | JOB 8 | 2011/8/4 12:10:15 |
| : | : | : |

FIG.6

| MULTIPLICITY | NUMBER OF EXECUTED JOBS | LOAD STATUS OBSERVATION TIME T (sec) | PREVIOUS THROUGHPUT VALUE | LATEST THROUGHPUT VALUE |
|---|---|---|---|---|
| 9 | 6 | 1 | 4 | 5 |

| EXECUTION COMPUTER NAME | NUMBER OF REQUESTED DIVISION JOBS | THROUGHPUT VALUE | NUMBER OF EXECUTED JOBS | SCHEDULED TIME (sec) |
|---|---|---|---|---|
| EXECUTION COMPUTER A | 3 | 6 | 3 | 5 |

| t(sec) | EXECUTION COMPUTER A (14) | EXECUTION COMPUTER B (16) | EXECUTION COMPUTER C (18) | ACCUMULATED NUMBER OF JOBS |
|---|---|---|---|---|
| 1 | 1(1) ⇩ T=1(s) | 1(1) ⇩ T=1(s) | 1(1) ⇩ T=1(s) | 3 |
| 2 | 3(3) ⇩ | 2(2) ⇩ | 2(2) ⇩ | 10 |
| 3 | 4(4) ⇩ | 2(2) ⇩ | 2(2) ⇩ | 18 |
| 4 | 5(5) ⇩ | 2(2) ⇩ | 2(2) ⇩ | 27 |
| 5 | 5(5) ⇩ | 3(3) ⇩ | 2(2) ⇩ | 37 |
| 6 | 6(6) ⇩ | 3(3) ⇩ | 2(2) ⇩ | 48 |
| 7 | 6(6) ⇩ | 3(3) ⇩ | 2(2) ⇩ | 59 |
| 8 | 6(6) ⇩ | 3(3) ⇩ | 2(2) ⇩ | 70 |
| 9 | 6(6) ⇩ | 4(4) ⇩ | 2(2) ⇩ | 82 |
| 10 | 7(7) ⇩ | 4(4) ⇩ | 2(2) ⇩ | 95 |
| 11 | 5(8) ⇩ | 0(4) ⇩ | 0(3) ⇩ | 100 |
| 12 | END | END | END | |

COMPUTER SYSTEM AND DIVIDED JOB PROCESSING METHOD AND PROGRAM

TECHNICAL FIELD

The present invention relates to a computer system and divided job processing method and program for managing jobs including a program for processing data by dividing the jobs into a plurality of divided jobs.

BACKGROUND ART

When a financial institution or the like executes, for example, daily processing or monthly processing, they sometimes process a large amount of data offline by means of batch processing. Under this circumstance, a method for distributing a large amount of data on a cluster of computer devices and executing parallel processing on them is suggested (see Patent Literature 1).

Patent Literature 1 describes that when a master process receives input data, it divides the received input data into smaller units and locates the divided data at a plurality of worker processes and each worker process processes the data which are divided into smaller units, returns the processing results to the master process and the master process summarizes the processing results of each worker process.

Even if a worker process which cannot execute processing occurs due to a failure at a plurality of servers or storage apparatuses, the method described in Patent Literature 1 makes it possible to reset the processing to another worker process instead of the worker process in which the failure has occurred.

Moreover, when processing data, a method for distributing the data to a plurality of distribution processing apparatuses (execution computers) and having them process the distributed data and having one distribution processing control unit (management computer) manage the processing status of each distribution processing apparatus is suggested (see Patent Literature 2). Patent Literature 2 describes that the management computer monitors a load on each execution computer and distributes jobs preferentially to an execution computer with a small load.

CITATION LIST

Patent Literature

[Patent Literature 1] U.S. Pat. No. 7,650,331
[Patent Literature 2] International Publication No. WO2004/086246

SUMMARY OF INVENTION

Problems to be Solved by the Invention

According to Patent Literature 1, job scheduling is performed by one master process. So, when many jobs are distributed to each worker process at once, the load on the master process becomes very heavy. Moreover, according to Patent Literature 2, a job execution status and the load of each job are managed by the management computer. Thus, when the management computer distributes many jobs to each execution computer at once, the management computer needs to recognize the status of each execution computer and the bad on the management computer becomes very heavy.

The present invention was devised in consideration of the above-described problem and it is one of its objectives to provide a computer system and divided job processing method and program capable of reducing a load on a management computer for managing a plurality of execution computers.

Means for Solving the Problems

In order to achieve the above-described object, provided according to the present invention is a computer system that uses a computer as a management computer, among a plurality of computers, for dividing a job including data and a program for processing the data into a plurality of divided jobs and managing them, and has a plurality of execution computers for executing divided jobs assigned by the management computer among the plurality of divided jobs, wherein each execution computer generates a job request including information about the number of the divided jobs based on a load on each execution computer and sends the generated job request to the management computer, and wherein when the management computer receives the job request from each execution computer, it assigns a divided job(s) to each execution computer according to the number of divided jobs included in the job request.

Advantageous Effects of invention

According to the present invention, it is possible to reduce a load on the management computer for managing a plurality of execution computers.

BRIEF DESCRIPTION OF DRAWINGS

FIG. 2 is a configuration diagram of a job information table managed by a management computer.
FIG. 4 is a configuration diagram of a request response table managed by the management computer.
FIG. 5 is a configuration diagram of an execution status table managed by an execution computer.
FIG. 6 is a configuration diagram of a computer information table managed by the execution computer.
FIG. 7 is a configuration diagram of a divided job request table managed by the execution computer.

FIG. 21 is a diagram for explaining a method for distributing divided jobs in each execution computer.

DESCRIPTION OF EMBODIMENTS

This embodiment is a system having a management computer, among a plurality of computers, for diving a job into a plurality of divided jobs and managing them and two or more execution computers for executing divided jobs assigned by this management computer, wherein each execution computer measures a load on the present computer, generates a job request including information about the number of executable divided jobs based on the measured load, and sends the generated job request to the management computer, and the management computer assigns as many divided jobs as designed by the received job request to the execution computer which is a requestor.

Figure 1:
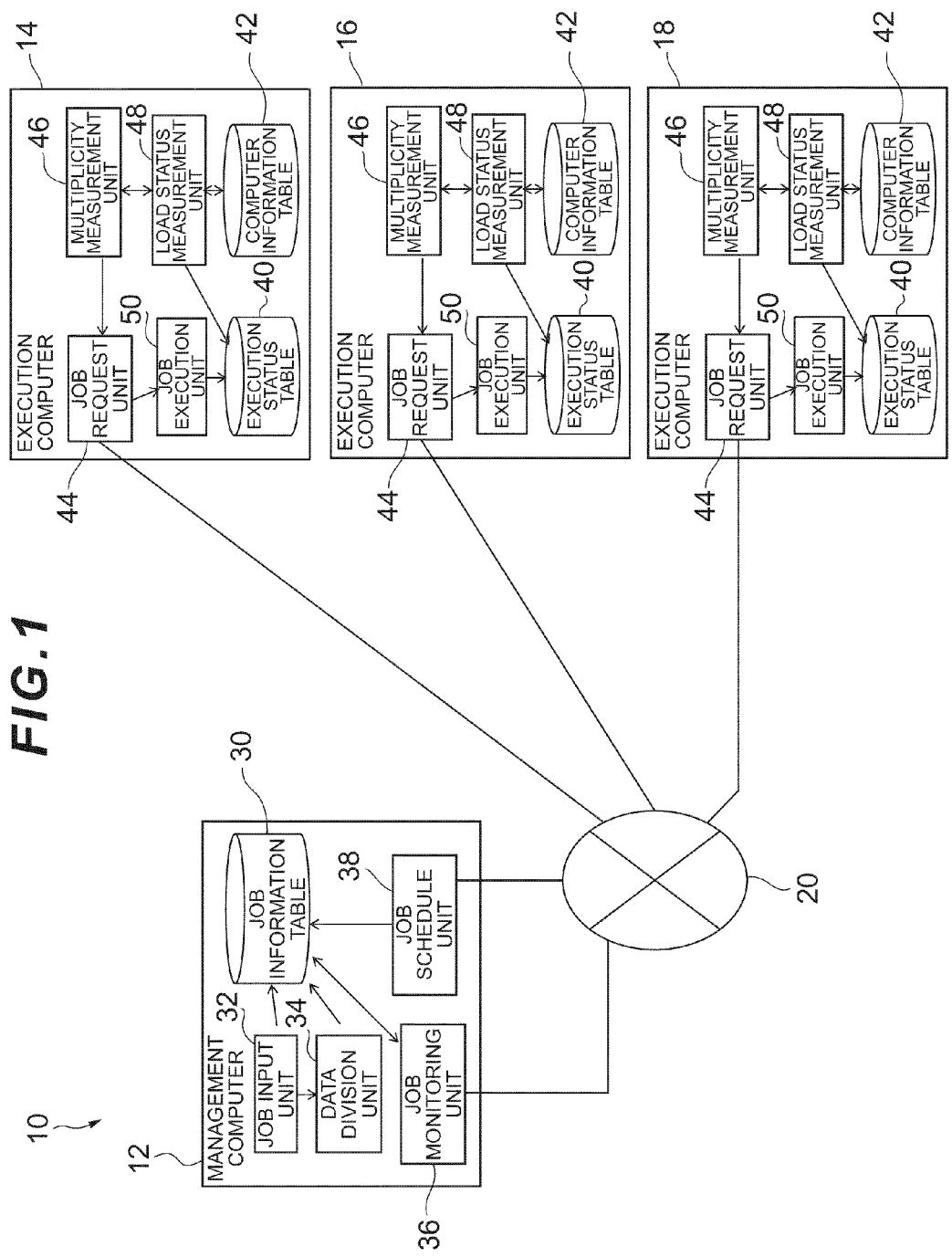
FIG. 1 is a configuration diagram for explaining an overall configuration of a computer system according to an embodiment to which the present invention is applied.

An embodiment of the present invention will be explained with reference to diagrams. FIG. 1 is a configuration diagram showing an example of a computer system to which the present invention is applied.

Referring to FIG. 1, a computer system 10 includes a management computer 12 and a plurality of execution computers 14, 16, 18; and the management computer 10 and each execution computer 14, 16, 18 are connected to each other via a network 20.

The management computer 12 is a computer equipped with, for example, a CPU (Central Processing Unit), a storage apparatus, a memory, and an input/output device (any of which is illustrated in the drawing); and the storage apparatus stores, for example, various tables and the memory stores, for example, various programs.

For example, the storage apparatus composed of a plurality of storage devices stores a job information table 30 and the memory stores a job input unit 32, a data division unit 34, a job monitoring unit 36, and a job schedule unit 38.

The job input unit 32 is configured by activation of a program stored in the memory, such as a job input program, by the CPU. Similarly, the data division unit 34, the job monitoring unit 36, and the job schedule unit 38 are configured by activation of programs stored in the memory, such as a data division program, a job monitoring program, and a job schedule program, respectively, by the CPU.

Each execution machine 14, 16, 18 is a computer equipped with, for example, a CPU, a storage apparatus, a memory, and an input/output device (any of which is illustrated in the drawing); and the storage apparatus stores, for example, various tables and the memory stores, for example, various programs.

For example, the storage apparatus composed of a plurality of storage devices stores an execution status table 40 and a computer information table 42 and the memory stores a job request unit 44, a multiplicity measurement unit 46, a load status measurement unit 48, and a job execution unit 50.

The job request unit 44 is configured by activation of a program stored in the memory, such as a job request program, by the CPU. Similarly, the multiplicity measurement unit 46, the load status measurement unit 48, and the job execution unit 50 are configured by execution of a multiplicity measurement program, a load status measurement program, and a job execution program, respectively, by the CPU.

The management computer 12 divides a job including data and a program for processing the data, such as a grid job, into a plurality of divided jobs and manages them. Under this circumstance, the management computer 12 manages the divided jobs by using various tables.

Next, FIG. 2 shows a configuration diagram of the job information table 30.

Referring to FIG. 2, the job information table 30 is a table to divide a grid job into a plurality of divided jobs and manage them and is constituted from a grid job name field 30A, a number-of-divisions field 30B, a divided job name field 30C, a program name field 30D, a divided data field 30E, a scheduled termination time field 30F, and a schedule status field 30G.

The grid job name is a name for identifying a grid job. An entry of the grid job name field 30A stores, for example, "Grid Job A" as a grid name.

The number of divisions is the number of divisions used when dividing a grid job into a plurality of divided jobs. An entry of the number-of-divisions field 30B stores, for example, "100" when a grid job is divided into 100 divided jobs.

The divided job name is information about a name for identifying each divided job. An entry of the divided job name field 30C stores, for example, "Job 1" as the name of a divided job.

The program name is information for identifying a name of a program used for each divided job. An entry of the program name field 30D stores, for example, "Program A" as the name of a program used for each divided job.

The divided data is information about a name for identifying divided data used for each divided job. An entry of the divided data field 30E stores the name of divided data used for each divided job by associating it with the relevant program. For example, if divided data used for Job 1 is "Data 1," "Data 1" is stored in an entry of the divided data field 30E as the divided data used for Job 1.

The divided job used herein means a job including divided data and a program for processing the divided data. Moreover, a data amount of the divided data included in each divided job is set to be uniform.

The scheduled termination time is information indicating scheduled termination time when each divided job is executed by the execution computer. An entry of the scheduled termination time field 30F stores the scheduled termination time when each divided job is executed by the execution computer.

The schedule status is information indicating the schedule status of each divided job. An entry of the schedule status field 30E stores: "TRUE" when the execution of each divided job is terminated by the execution computer, and "RUN" when each divided job is being executed by the execution computer. Furthermore, in a state where each divided job has not been executed by the execution computer, that is, in an unscheduled state, an entry of the schedule status field 30E stores "FALSE."

Figure 3:
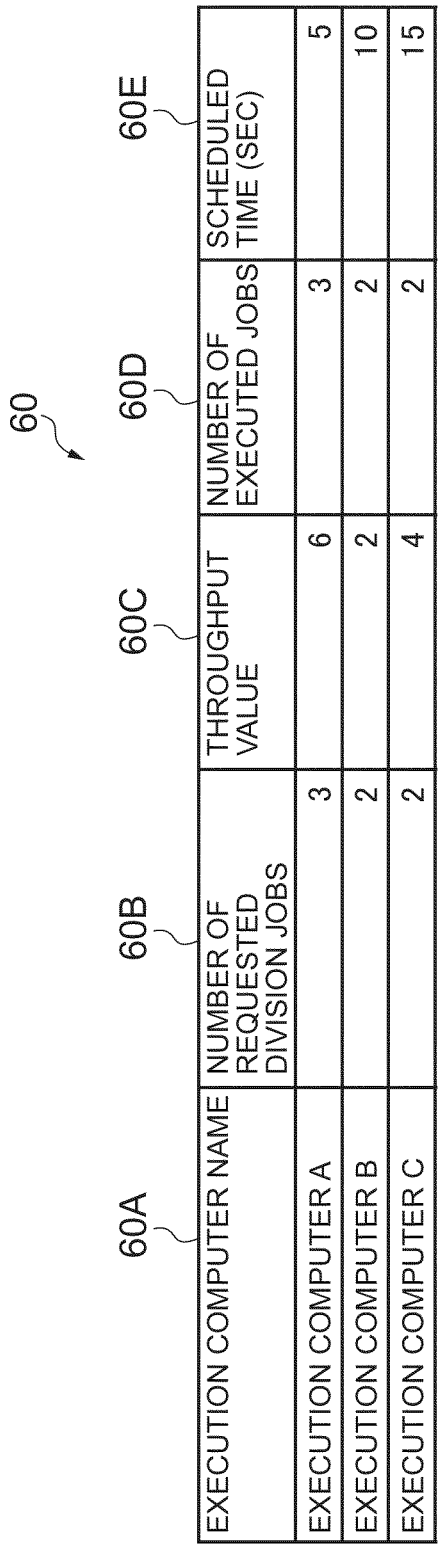
FIG. 3 is a configuration diagram of an execution status table managed by the management computer.

Next, FIG. 3 shows a configuration diagram of the execution status table 60.

Referring to FIG. 3, the execution status table 60 is a table used by the job monitoring unit 36 to manage the execution status of each execution computer 14, 16, 18 based on the information acquired from each execution computer 14, 16, 18 and is constituted from an execution computer name field 60A, a number-of-requested-divided-jobs field 60B, a throughput value field 60C, a number-of-executed-jobs field 60D, and a scheduled time field 60E.

The execution computer name is a name for identifying the execution computer 14, 16, 18. Regarding an entry of the execution computer name field 60A, for example, a first entry stores "Execution Computer A" when the name of the execution computer 14 is "Execution Computer A." Furthermore, when the name of the execution computer 16 is "Execution Computer B," a second entry of the execution computer name field 60A stores "Execution Computer B." Similarly, when the name of the execution computer 18 is "Execution Computer C," a third entry of the execution computer name field 60A stores "Execution Computer C."

The number of requested divided jobs is information indicating the number of divided jobs requested by each execution computer 14, 16, 18. An entry of the number-of-requested-divided-jobs field 60B stores the number of divided jobs requested by each execution computer 14, 16, 18. For example, if the execution computer 14 requests three divided jobs as the divided jobs, a first entry of the number-of-requested-divided-jobs field 60B stores "3."

The throughput value is information indicating the number of divided jobs which can be processed in unit time (sec) by each execution computer 14, 16, 18.

An entry of the throughput value field 60C stores the number of execution jobs which can be processed in unit time (sec) by each execution computer 14, 16, 18. For example, if the execution computer 14 can process six divided jobs in unit time (sec), a first entry of the throughput value field 60C stores "6."

The number of executed jobs is information indicating the number of divided jobs which are being executed by each execution computer 14, 16, 18.

An entry of the number-of-executed-jobs field 60D stores the number of divided jobs which are being executed by each execution computer 14, 16, 18. For example, if the execution computer 14 processes three divided jobs, a first entry of the number-of-executed-jobs field 60D stores "3."

The scheduled time (sec) is information indicating estimated time (sec) required for each execution computer 14, 16, 18 to execute one divided job.

An entry of the scheduled time field 60E stores the estimated time (sec) required for each execution computer 14, 16, 18 to execute one divided job. For example, if the time required for the execution computer 14 to execute one divided job is 5 seconds, a first entry of the scheduled time field 60E stores "5."

Next, FIG. 4 shows a configuration diagram of the request response table 62.

Referring to FIG. 4, the request response table 62 is a table used by the job schedule unit 38 to assign a divided job to each execution computer 14, 16, 18 and is constituted from a distributing execution computer name field 62A, a program name 62B, and a divided data field 62C.

When the job schedule unit 38 assigns a divided job to an execution computer, the distributing execution computer name is information about an execution computer name for identifying the execution computer to which the divided job is assigned.

When the job schedule unit 38 assigns each divided job to an execution computer, an entry of the distributing execution computer name field 62A stores the execution computer name for identifying the execution computer to which the relevant divided job is assigned. For example, if the location to which the divided job is assigned is the execution computer 14, a first entry of the distributing execution computer name field 62A stores "Execution Computer A."

The program name is information about the name of a program used for a divided job. An entry of the program name field 62B stores information for identifying the name of a program used for the execution computer to which the relevant divided job is assigned. For example, if "Program A" is used as the program by the execution computer 14, a first entry of the program name field 62B stores "Program A."

The divided data is a name for identifying divided data used for each divided job.

An entry of the divided data field 62C stores divided data used for each divided job corresponding to the program. For example, if the divided data used by the execution computer 14 are "Data 3, Data 4, and Data 5," a first entry of the divided data field 62C stores "Data 3, Data 4, and Data 5."

Next, FIG. 5 shows a configuration diagram of the execution status table 40.

Referring to FIG. 5, the execution status table 40 is a table used by each execution computer 14, 16, 18 to manage the execution status when they execute each divided job and is constituted from a job ID field 40A, a divided job name field 40B, and a job termination time field 40C. Incidentally, job start time for specifying time when each execution computer 14, 16, 18 starts executing each divided job can be added to the execution status table 40.

The job ID is an identifier for uniquely identifying each divided job.

An entry of the job ID field 40A stores an identifier for identifying each divided job. For example, if the identifier of the divided job is "1," an entry of the job ID field 40A stores "1."

The divided job name is information about a name for identifying each divided job.

An entry of the divided job name field 40B stores the name for identifying each divided job. For example, if the name of the divided job is "Job 2," an entry of the job name field 40B stores "Job 2."

The job termination time is information indicating termination time of each divided job executed by each execution computer. An entry of the job termination time field 40C stores the termination time as well as year, month, and day of termination of each divided job executed by each execution computer.

Next, FIG. 6 shows a configuration diagram of the computer information table 42.

Referring to FIG. 6, the computer information table 42 is a table used by each execution computer 14, 16, 18 to manage information used when executing each divided job and is constituted from a multiplicity field 42A, a number-of-executed-jobs field 42B, a load status observation time field 42C, a previous throughput value field 42D, and a latest throughput value field 42E.

The multiplicity is information indicating the number of simultaneously executable divided jobs when each execution computer 14, 16, 18 executes each divided job.

An entry of each multiplicity field 42A stores the number of divided jobs which can be executed simultaneously by each execution computer 14, 16, 18. For example, when the execution computer 14 can execute nine divided jobs at the same time, an entry of the multiplicity field 42A stores "9."

The number of executed jobs is information indicating the number of divided jobs which are being executed by each execution computer 14, 16, 18.

An entry of the number-of-executed-jobs field 42B stores the number of divided jobs which are being executed by each execution computer 14, 16, 18. For example, if the execution computer 14 is executing six divided jobs, an entry of the number-of-executed-jobs field 42B stores "6."

The load status observation time T (sec) is time (sec) for the load status measurement unit 48 to observe the load status. For example, if the load status measurement unit 48 observes the load status every second, an entry of the load status observation time field 42C stores "1."

The previous throughput value is information indicating the number of divided jobs executed in unit time (sec) by each execution computer 14, 16, 18 during processing within the previous load status observation time T. An entry of the previous throughput value field 42D stores information indicating the number of divided jobs, which were executed in unit time (sec) by each execution computer 14, 16, 18 during the processing executed last time, as a throughput value.

The latest throughput value is the latest information of the information indicating the number of divided jobs executed in unit time (sec) by each execution computer 14, 16, 18. An entry of the latest throughput value field 42E stores, as a throughput value, the latest information of the information indicating the number of divided jobs executed in unit time (sec) by each execution computer 14, 16, 18.

Next, FIG. 7 shows a configuration diagram of the divided job request table 64.

Referring to FIG. 7, the divided job request table 64 is a table used by each execution computer 14, 16, 18 to manage information to request executable divided jobs from the management computer 12 and is constituted from an execution computer name field 64A, a number-of-requested-divided-jobs field 64B, a throughput value field 64C, a number-of-executed-jobs field 64D, and a scheduled time field 64E.

The execution computer name is a name for identifying the execution computer 14, 16, 18. For example, if the name of the execution computer 14 is "Execution Computer A," a first entry of the execution computer name field 64A stores "Execution Computer A."

The number of requested divided jobs is information indicating the number of divided jobs requested by each execution computer 14, 16, 18. An entry of the number-of-requested-divided-jobs field 64B stores the number of divided jobs requested by each execution computer 14, 16, 18. For example, if the execution computer 14 requests three divided jobs as the divided jobs, a first entry of the number-of-requested-divided-jobs field 64B stores "3."

The throughput value is information indicating the number of divided jobs which can be executed in unit time (sec) by each execution computer 14, 16, 18.

An entry of the throughput value field 64 stores the number of execution jobs which can be processed in unit time (sec) by each execution computer 14, 16, 18. For example, if the execution computer 14 can process six divided jobs in unit time (sec), a first entry of the throughput value field 64C stores "6."

The number of executed jobs is information indicating the number of divided jobs which are being executed by each execution computer 14, 16, 18.

An entry of the number-of-executed-jobs field 64 stores the number of divided jobs which are being executed (or have been executed) by each execution computer 14, 16, 18. For example, if the execution computer 14 is processing two divided jobs, a first entry of the number-of-executed-jobs field 64D stores "3."

The scheduled time (sec) is information indicating estimated time (sec) required for each execution computer 14, 16, 18 to execute a divided job.

An entry of the scheduled time field 64E stores estimated time (sec) required by each execution computer 14, 16, 18 to execute a divided job. For example, if the time required for the execution computer 14 to execute a divided job is 5 seconds, a first entry of the scheduled time field 64E stores "5."

(Processing of Execution Computer)

Every time the load status observation time T comes, the load status measurement unit 48 for each execution computer 14, 16, 18 measures the throughput value and the multiplicity measurement unit 46 decides the multiplicity which makes it possible to process the largest number of divided jobs based on a history of the measurement results. The job request unit 44 calculates the difference between the multiplicity decided by the multiplicity measurement unit 46 and the number of executed divided jobs, records the calculated difference as the number of requested divided jobs in the divided job request table 64, and sends the recorded information of the divided job request table 64 to the job schedule unit 38 for the management computer 12. The job execution unit 50 executes the divided jobs sent from the job schedule unit 38. Specific details will be explained below.

Next, processing of each execution computer will be explained with reference to a flowchart in FIG. 8.

Firstly, the job request unit 44 for the execution computer 14, 16, 18 requests a divided job from the management computer 12 based on the information recorded in the divided job request table 64 (S11).

Then, each execution computer 14, 16, 18 judges whether it has received the divided job from the management computer 12 or not (S12).

If each execution computer 14, 16, 18 obtains an affirmative judgment result in step S12, the job execution unit 50 executes the divided job sent from the management computer 12 (S13), adds one (+1) to the number of executed jobs in the computer information table 42 (S14), and proceeds to processing in step S15.

If each execution computer 14, 16, 18 obtains a negative judgment result in step S12 or after the processing in step S14 terminates, the execution computer 14, 16, 18 judges whether the execution of the divided job received from the management computer 12 has been terminated of not (S15).

If each execution computer 14, 16, 18 obtains an affirmative judgment result in step S15, it registers job termination time, as the execution result of the divided job, in the execution status table 40 (S16), then reduces one (−1) from the number of executed jobs in the computer information table 42 (S17), then sends termination of the divided job to the management computer 12 (S18), and returns to the processing in step S11.

On the other hand, if each execution computer 14, 16, 18 obtains a negative judgment result in step S15, this means that the divided job has not terminated and, therefore, each execution computer 14, 16, 18 returns to the processing in step S11.

Each execution computer 14, 16, 18 can execute divided jobs at the multiplicity, which makes it possible to process the largest number of divided jobs, by repeating the processing from step S11 to step S18.

Figure 9:
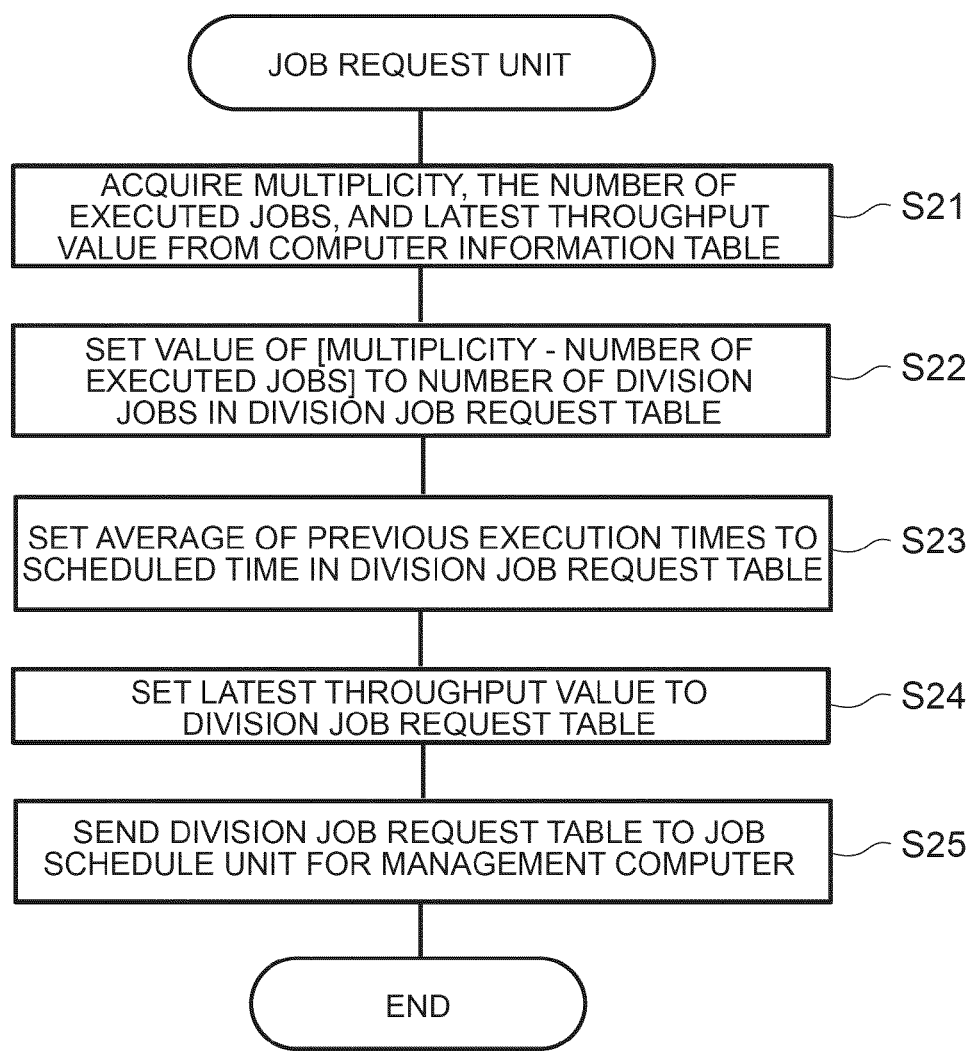
FIG. 9 is a flowchart for explaining processing of a job request unit.

Next, processing of the job request unit for each execution computer will be explained with reference to a flowchart in FIG. 9.

Figure 8:
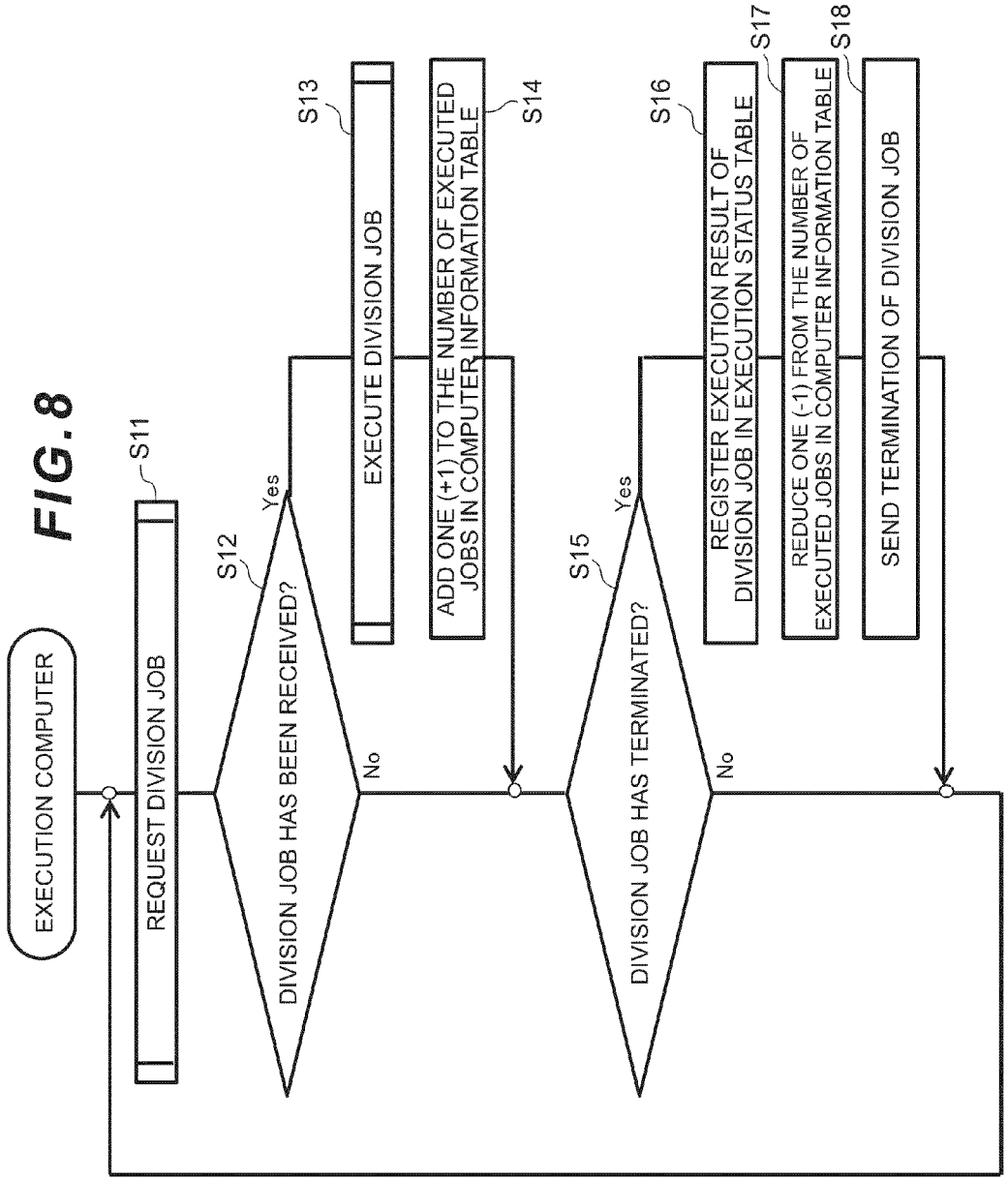
FIG. 8 is a flowchart for explaining processing of the entire execution computer.

This processing is the specific content of step S11 in FIG. 8 and is started by activation of the job request unit 44 by the CPU.

The job request unit 44 refers to the computer information table 42 and acquires the multiplicity, the number of executed jobs, and the latest throughput value from the computer information table 42 (S21).

Next, the job request unit 44 sets a value of (multiplicity—the number of executed jobs) to the number of divided jobs in the divided job request table 64 by associating it with each execution computer (S22). For example, if the multiplicity is "9" and the number of executed jobs is "6" with respect to the execution computer 14, "3" is set to the number of requested divided jobs in the divided job request table 64 corresponding to the execution computer 14.

Next, the job request unit 44 sets an average of the previous execution time (average time) to the scheduled time in the divided job request table 64 (S23). For example, if the average time of the execution time when a plurality of divided jobs were executed by the previous processing is 5 seconds, "5" is set to the scheduled time in the divided job request table 64.

Then, the job request unit 44 refers to the computer information table 42 and sets the latest throughput value as the throughput value in the divided job request table 64 (S24).

Subsequently, the job request unit 44 generates the information registered in the divided job request table 64 as a job request, sends the generated job request collectively to the job schedule unit 38 for the management computer 12 (S25), and terminates the processing in this routine.

Figure 10:
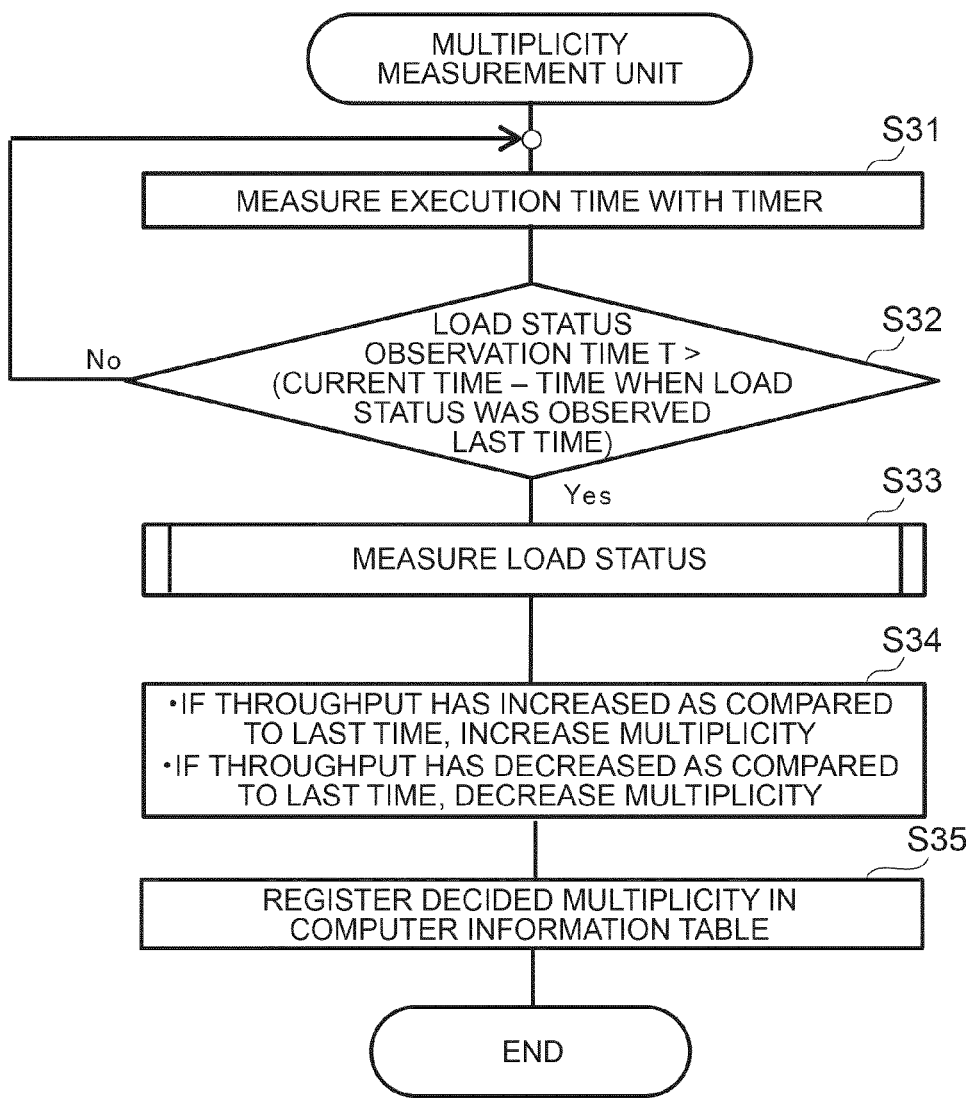
FIG. 10 is a flowchart for explaining processing of a multiplicity measurement unit

Next, processing of the multiplicity measurement unit for each execution computer will be explained with reference to a flowchart in FIG. 10.

This processing is started by activation of the multiplicity measurement unit 46 by the CPU.

The multiplicity measurement unit 46 activates a timer, measures that activation time as execution time (S31), and judges whether bad status observation time T is larger than (current time—time when the load status was observed last time) or not (S32).

If the multiplicity measurement unit 46 obtains a negative judgment result in step S32, that is, if the activation time of the timer does not exceed the load status observation time T, the multiplicity measurement unit 46 returns to the processing in step S31 and repeats the processing in steps S31 and S32; and if the multiplicity measurement unit 46 obtains an affirmative judgment result in step S32, that is, if the activation time of the timer exceeds the load status observation time T, the multiplicity measurement unit 46 proceeds to processing in step S33.

In step S33, the load status measurement unit 48 measures the load status of the execution computer.

Subsequently, if the throughput has increased from last time, the multiplicity measurement unit 46 executes processing for increasing the multiplicity based on the measurement result of the load status measurement unit 48; and if the throughput has decreased from last time, the multiplicity measurement unit 46 executes processing for decreasing the multiplicity (S34).

For example, if the throughput value measured by the load status measurement unit 48 tends to increase from the throughput value measured for the previous load status observation time T for each load status observation time T, the multiplicity measurement unit 46 decides the latest multiplicity as a value increased from the multiplicity decided for the previous load status observation time T; and if the throughput value measured by the load status measurement unit 48 tends to decrease from the throughput value measured for the previous load status observation time T, the multiplicity measurement unit 46 decides the latest multiplicity as a value decreased from the multiplicity decided for the previous load status observation time T.

Next, the multiplicity measurement unit 46 registers the multiplicity, which was decided in step S34, in the computer information table 42 (S35) and terminates the processing in this routine.

Incidentally, even if the CPU for executing, for example, the divided jobs is composed of a single core or a plurality of cores, the multiplicity measurement unit 46 will measure, for example, the number of divided jobs which can be executed simultaneously by the single core or each of the plurality of cores within the load status observation time T.

Furthermore, if each piece of divided data has a uniform data amount, the data amount can be used as a parameter indicating the number of divided jobs instead of the multiplicity.

Figure 11:
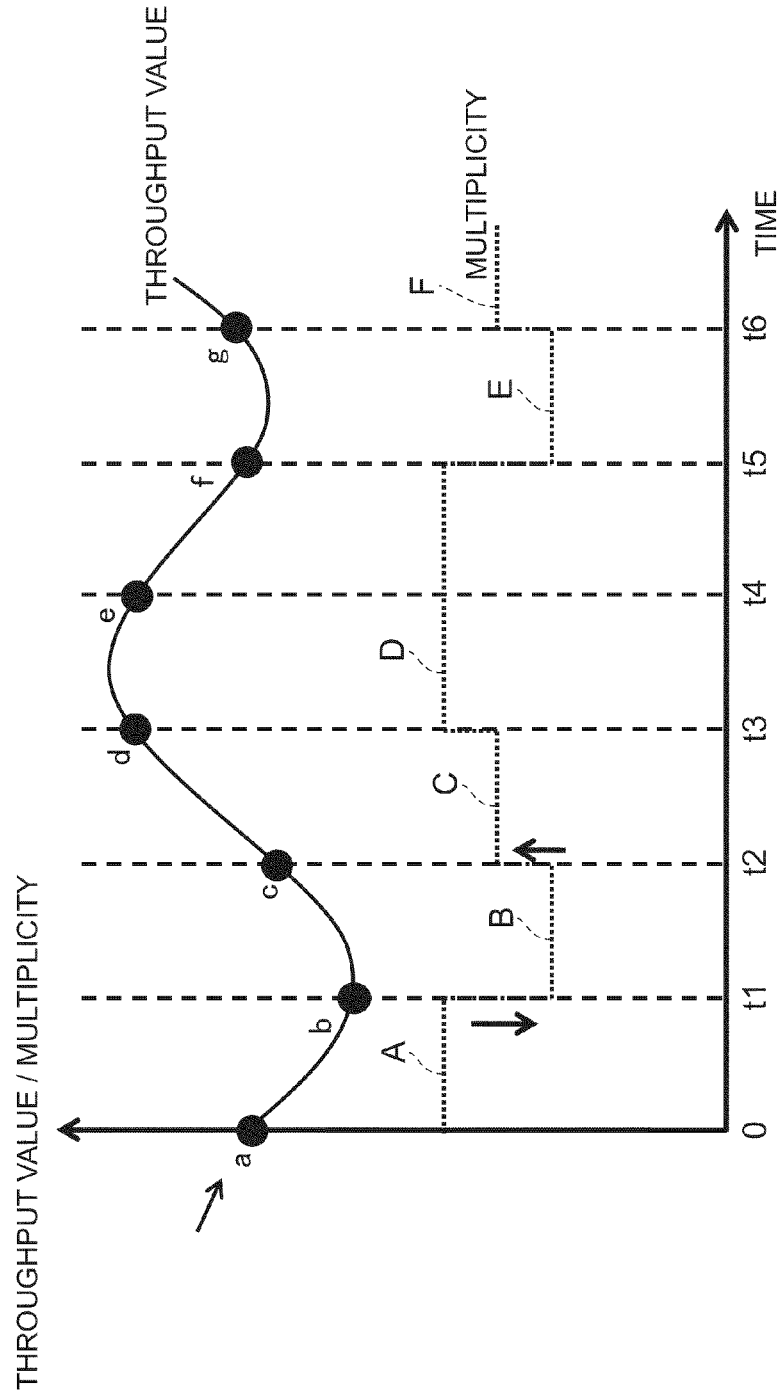
FIG. 11 is a diagrammatic drawing for explaining the relationship between a throughput value and multiplicity.

Next, FIG. 11 shows a diagrammatic drawing for explaining the relationship between the throughput value and the multiplicity.

Referring to FIG. 11, if the multiplicity is to be decided by each execution computer, the multiplicity is decided based on changes of the throughput value.

For example, if the throughput value changes as a, b, c, d, e, f, g every certain period of time (sec) from time t0 to from t6, the throughput value as a result of comparison between time 0 and time t1 becomes a-b which is a negative value and, therefore, the multiplicity between time t1 and time t2 is decreased to multiplicity B, which is lower than multiplicity A between time 0 and time t1.

On the other hand, as a result of comparison of the throughput value between time t1 and time t2, the throughput value increases from b to c and the throughput value between time t1 and time t2 becomes c-b which is a positive value and, therefore, the multiplicity between time t2 and time t3 is increased to multiplicity C which is higher than multiplicity B.

Specifically speaking, the throughput value is measured every certain period of time (sec); and if the measured throughput value tends to decrease, the multiplicity is decreased; and if the measured throughput value tends to increase, the multiplicity is increased.

If the throughput value tends to decrease, this means that processing power of each execution computer decreases, and the multiplicity is thereby decreased. On the other hand, if the throughput value tends to increase, this means the processing power of each execution computer is sufficient, and the multiplicity is thereby increased.

Figure 12:
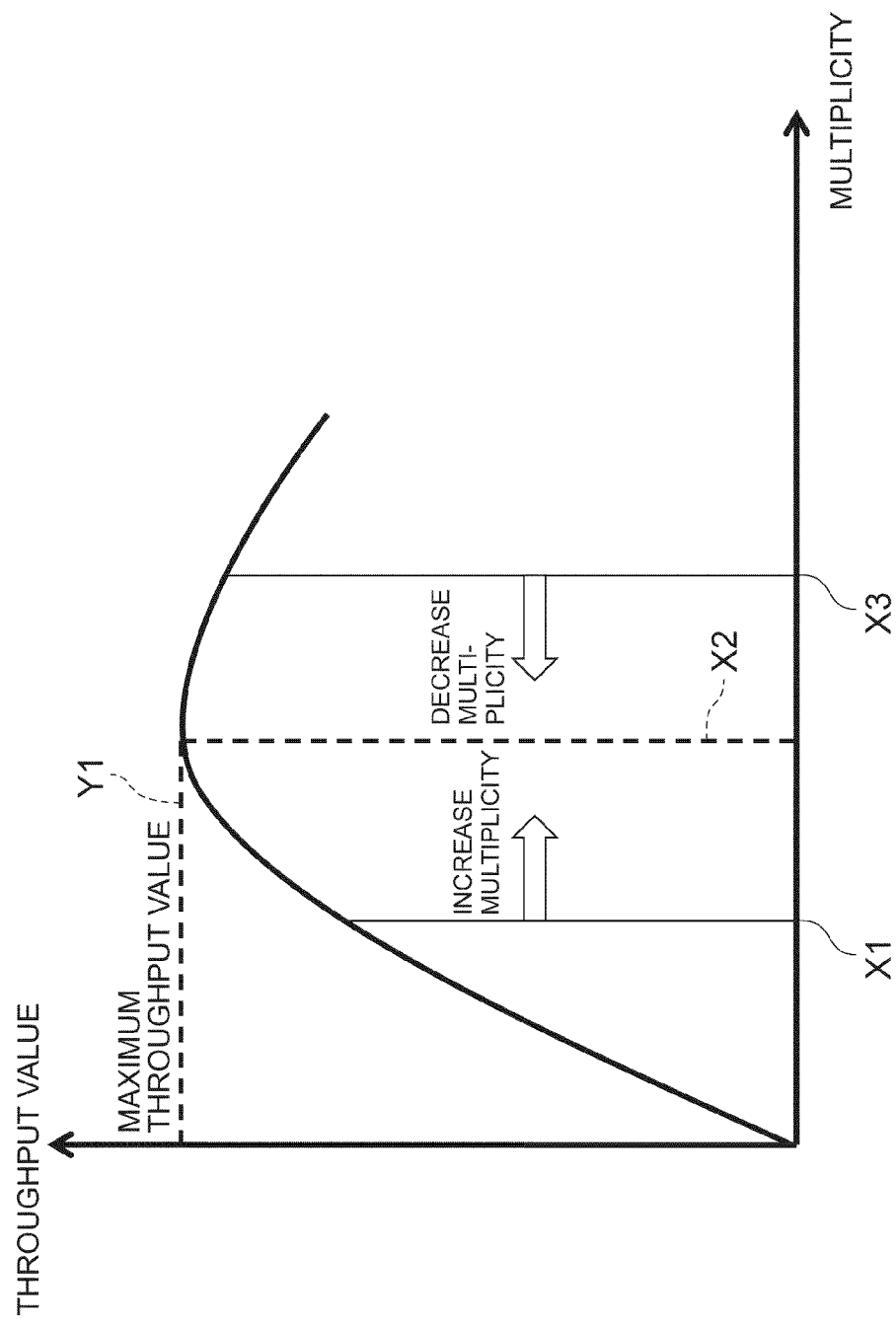
FIG. 12 is a diagrammatic drawing for explaining the relationship between the throughput value and the multiplicity.

Next, FIG. 12 shows a diagrammatic drawing for explaining the relationship between the maximum throughput value and the multiplicity.

Referring to FIG. 12, if multiplicity X1 is increased to multiplicity X2, the throughput value becomes saturated at maximum throughput value Y1; and even if the multiplicity is increased from X2, the throughput value will gradually decrease from the maximum throughput value Y1.

Therefore, if the multiplicity is decided based on the throughput value and the throughput value tends to increase, it is desirable that the multiplicity lower than multiplicity X2 should be selected; and if the throughput value tends to decrease, it is desirable that the multiplicity higher than multiplicity X2 should be selected.

Figure 13:
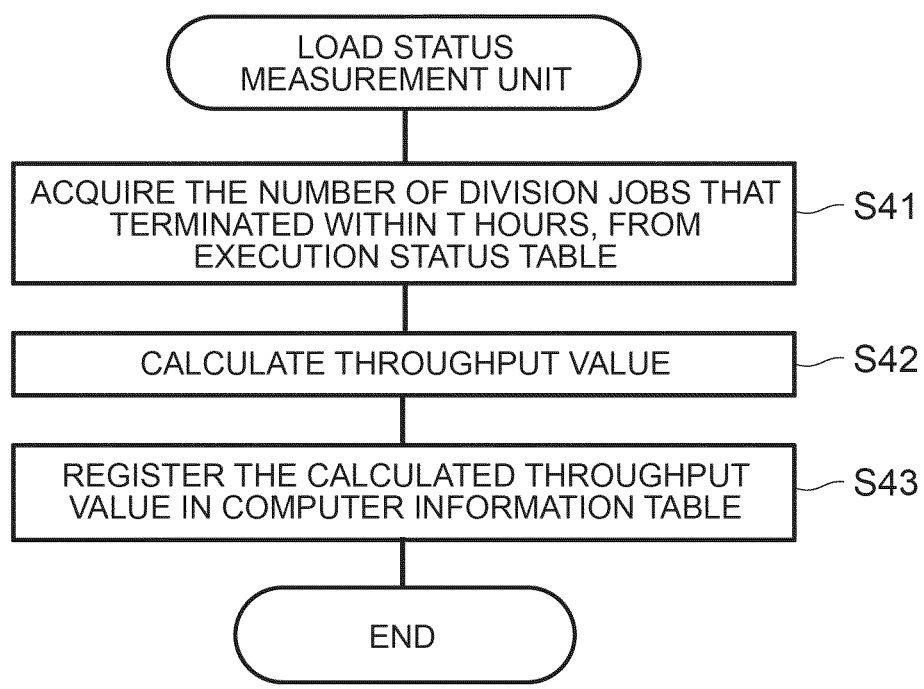
FIG. 13 is a flowchart for explaining processing of a load status measurement unit.

Next, processing of the load status measurement unit for each execution computer will be explained with reference to a flowchart in FIG. 13.

This processing is started by activation of the load status measurement unit 48 by the CPU.

The load status measurement unit 48 refers to the execution status table 40 and acquires the number of divided jobs which terminated during time T (load status observation time) from the execution status table 40 (S41). Specifically speaking, the load status measurement unit 48 acquires the number of divided jobs based on the number of divided job names for which the job termination time is registered during time T.

Next, the load status measurement unit 48 calculates the throughput value based on the number of divided jobs which terminated during time T (S42), registers the calculated throughput value as the latest throughput value in the computer information table 42 (S43), and terminates the processing in this routine. When this happens, the load status measurement unit 48 registers the number of divided jobs, which terminated during time T, as the number of executed jobs in the computer information table 42.

Incidentally, the load status measurement unit 48 for each execution computer 14, 16, 18 can measure, as a load on each execution computer 14, 16, 18, a CPU activity ratio indicating an activity ratio when the CPU for executing, for example, the processing on the divided jobs executes at least the processing on the divided jobs, a memory activity ratio indicating an activity ratio when the CPU for executing, for example, the processing on the divided jobs uses the memory when executing the processing on the divided jobs, and an I/O activity ratio indicating an activity ratio when the CPU for executing, for example, the processing on the divided jobs executes data input/output processing, respectively.

Figure 14:
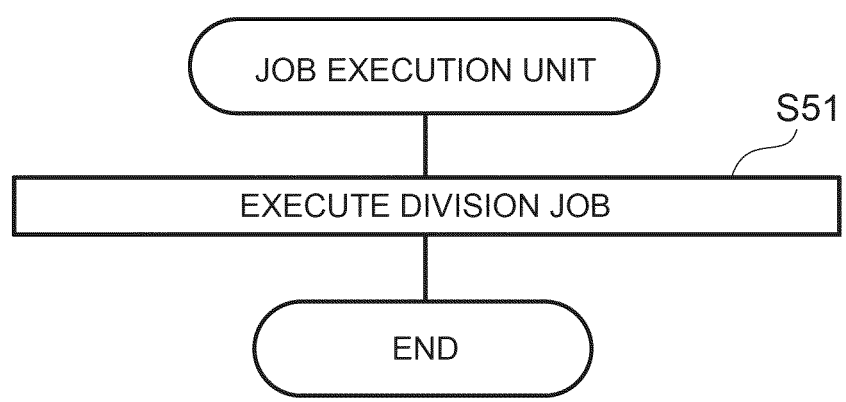
FIG. 14 is a flowchart for explaining processing of a job execution unit.

Next, processing of the job execution unit for each execution computer will be explained with reference to a flowchart in FIG. 14.

This processing is started by activation of the job execution unit 44 by the CPU.

The job execution unit 44 receives a divided job sent from the job schedule unit 38 for the management computer 12 and executes the received divided job (S51). When this happens, the job execution unit 44 processes divided data attached to the received divided job in accordance with a program attached to the received divided job; and after terminating executing the divided job, the job execution unit 44 sends execution termination (divided job termination notice) to the job monitoring unit 36 for the management computer 12 and terminates the processing in this routine.

Furthermore, the job execution unit 44 for any of the respective execution computers 14, 16, 18 summarizes the processing content of each execution computer 14, 16, 18 and executes the summarized processing.

(Processing of Management Computer)

After the job input unit 32 for the management computer 12 accepts a grid job, the data division unit 34 divides the grid job into a plurality of divided jobs, associates the divided jobs with the relevant program and registers them in the job information table 30, and creates the divided jobs. Every time a divided job request (job request) is issued from each execution computer, the job schedule unit 38 refers to the job information table 30, creates the request response table 62 for the execution computer, to which the job request has been issued, and executes a schedule in accordance with the content of the created request response table 62.

Figure 15:
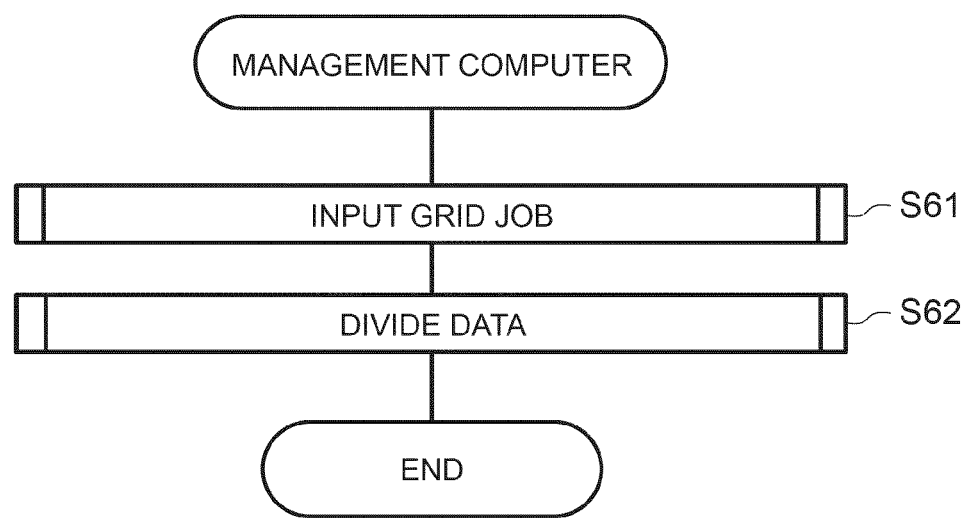
FIG. 15 is a flowchart for explaining processing of the management computer.

Next, the entire processing content of the management computer 12 will be explained with reference to a flowchart in FIG. 15.

Firstly, the job input unit 12 for the management computer 12 inputs a grid job based on the user's operation (S61).

Subsequently, the data division unit 34 for the management computer 12 divides the grid job, which has been input to the job input unit 32, into a plurality of divided jobs (S62) and terminates the processing in this routine.

Figure 16:
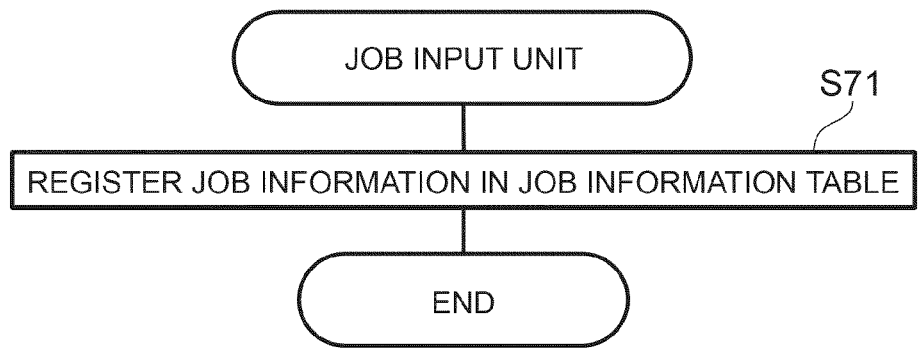
FIG. 16 is a flowchart for explaining processing of a job input unit.

Next, processing of the job input unit for the management computer 12 will be explained with reference to a flowchart in FIG. 16.

This processing is started by activation of the job input unit 32 by the CPU.

When a grid job is input based on the user's operation, the job input unit 32 registers the input grid job as job information in the job information table 30 (S71). Examples of the job information in this case can be a grid job name, the number of divisions, and a program name.

Figure 17:
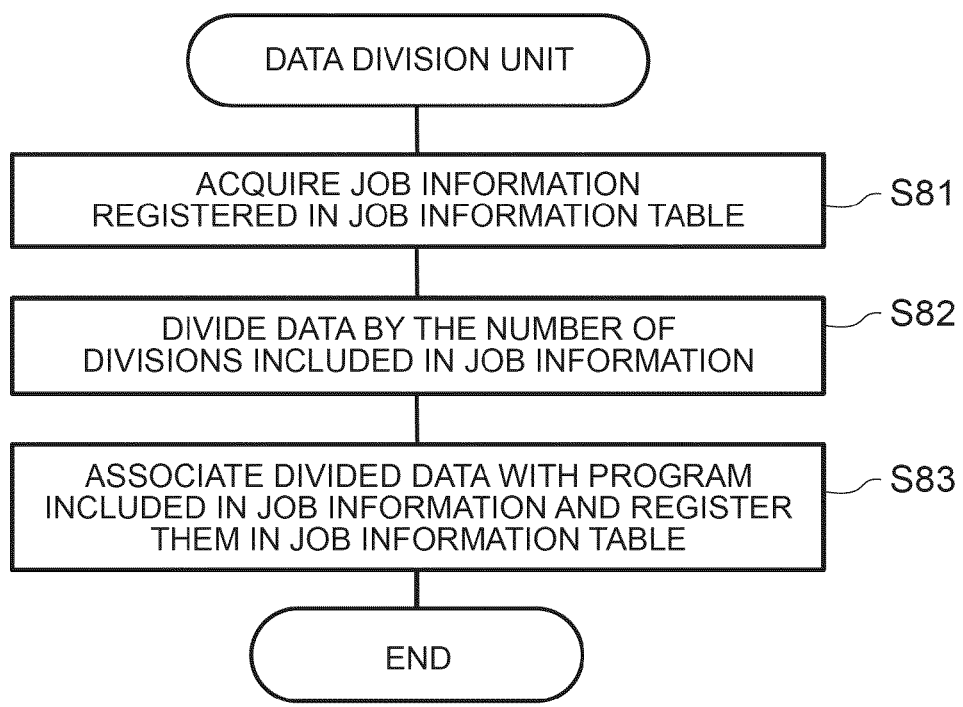
FIG. 17 is a flowchart for explaining processing of a data division unit.

Next, processing of the data division unit for the management computer 12 will be explained with reference to a flowchart in FIG. 17.

This processing is started by activation of the data division unit 34 by the CPU.

The data division unit 34 refers to the job information table 30, acquires the job information registered in the job information table 30 (S81), and divides the data by the number of divisions included in the acquired job information, for example, by 100 (S82).

Next, the data division unit 34 associates the divided data with the program included in the job information and registers them in the job information table 30 (S83), and terminates the processing in this routine.

The job information in this case includes the grid job name, the number of divisions, the divided job name, and the program name.

Figure 18:
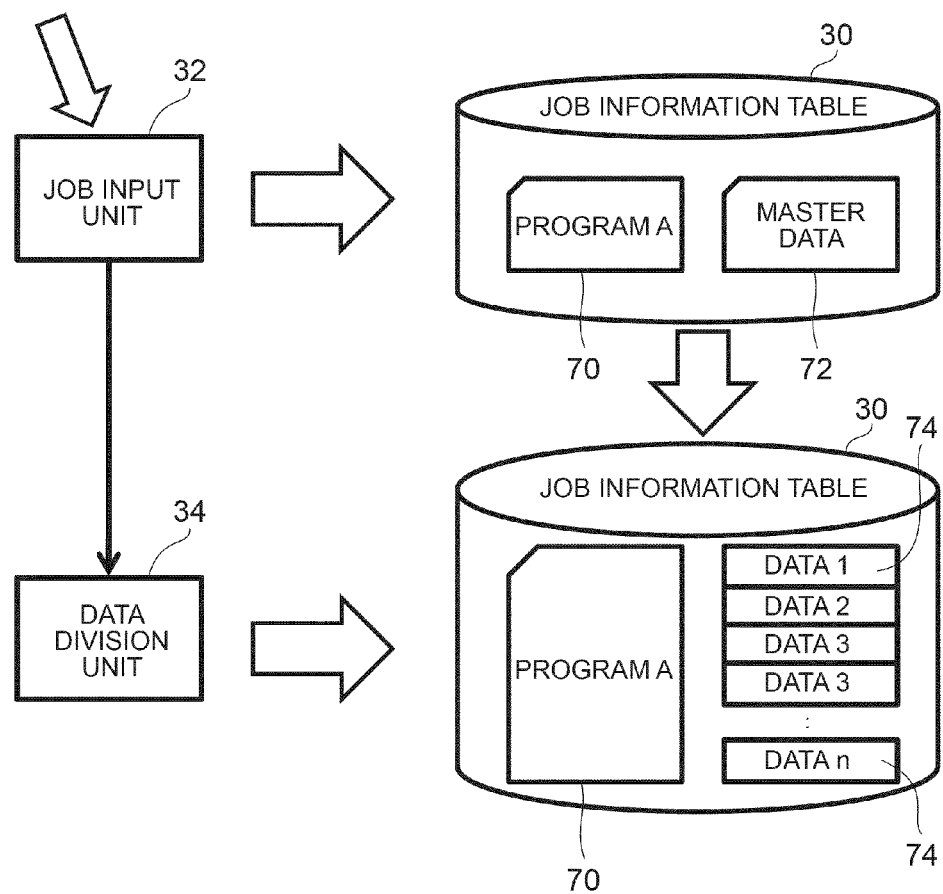
FIG. 18 is a diagram for explaining processing of the job input unit and the data division unit.

Next, the data division method and the divided job generation method will be explained with reference to FIG. 18.

When a grid job is input to the job input unit 32, the job input unit 32 registers a program 70 for processing the grid job and master data 72 included in the grid job in the job information table 30.

Subsequently, the data division unit 34 divides the master data 72 by the input number of divisions into, for example, n pieces, associates each piece of divided data 74 with the program 70, and registers them in the job information table 30.

When this happens, the data division unit 34 divides the grid job into a plurality of divided jobs, associates each divided job with the program 70 and registers them in the job information table 30, and also associates each piece of data 74 with the program 70 and registers them in the job information table 30.

Figure 19:
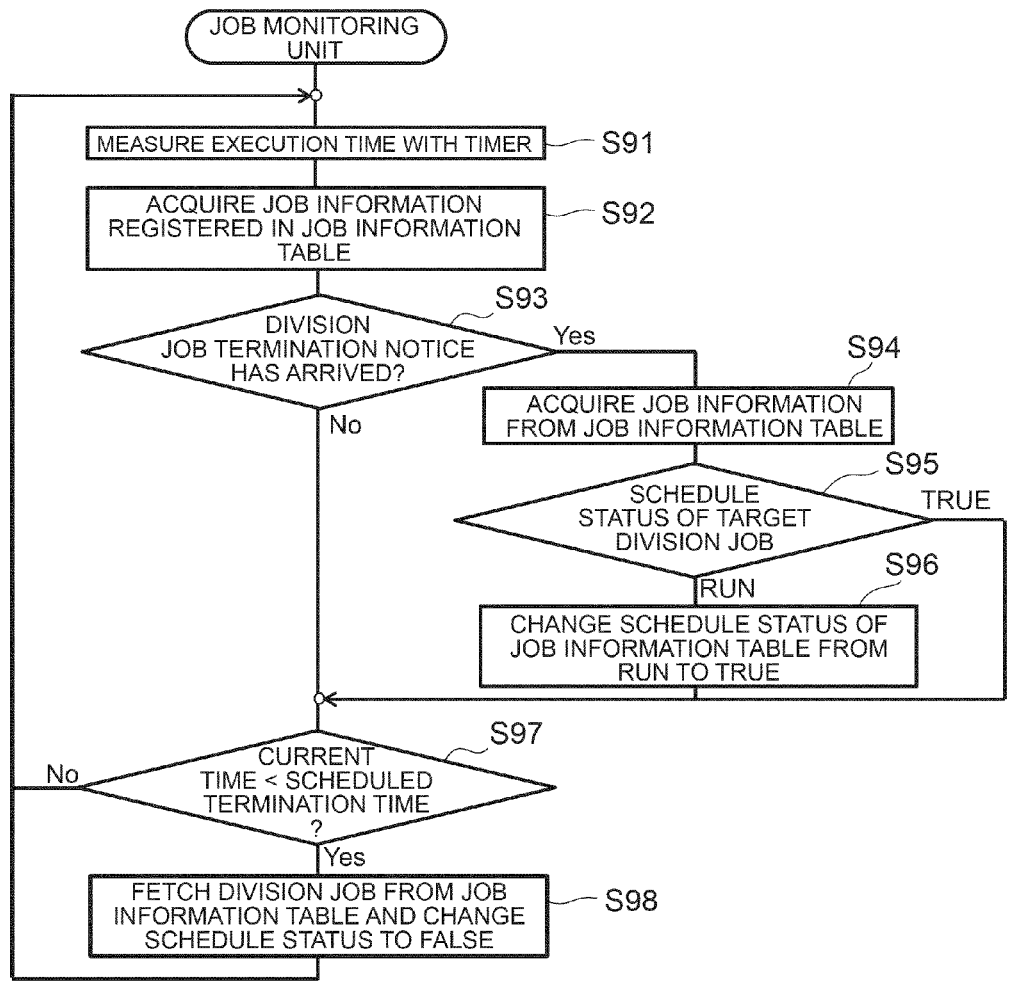
FIG. 19 is a flowchart for explaining processing of a job monitoring unit.

Next, processing of the job monitoring unit 36 for the management computer 12 will be explained with reference to a flowchart in FIG. 19.

This processing is started by activation of the job monitoring unit 36 by the CPU.

The job monitoring unit 36 activates the timer, measures the activation time of the timer as execution time (S91), and acquires the job information registered in the job information table 30 from the job information table 30 (S92). The job information in this case is all pieces of information registered in the job information table 30.

Next, during the process of monitoring a divided job requested from the execution computer, the job monitoring unit 36 judges whether or not it has received a termination notice as information about the divided job which is a target to be monitored (S93).

If it is determined in step S93 that the job monitoring unit 36 has received the divided job termination notice, the job monitoring unit 36 acquires the job information from the job information table 30 (S94) and judges the schedule status of the divided job which is a target to be managed (S95).

If the schedule status of the target divided job to be monitored is "TRUE" in step S95, the job monitoring unit 36 proceeds directly to processing in step S97. If the schedule status of the target divided job to be monitored is "RUN" (active), the job monitoring unit 36 changes the schedule status in the job information table 30 from "RUN" to "TRUE" on condition that it has received the divided job termination notice (S96); and then the job monitoring unit 36 proceeds to the processing in step S97.

Furthermore, if the job monitoring unit 36 obtains a negative judgment result in step S93, that is, if the job monitoring unit 36 determines that it has not received the divided job termination notice, the job monitoring unit 36 proceeds to the processing in step S97.

In step S97, the job monitoring unit 36 judges whether the current time is smaller than the scheduled termination time, based on the activation time of the timer, and if the job monitoring unit 36 obtains a negative judgment result in step S97, that is, if the current time is smaller than the scheduled termination time, the job monitoring unit 36 returns to the processing in step S91 and repeats the processing from step S91 to step S96.

On the other hand, if the job monitoring unit 36 obtains an affirmative judgment result in step S97, that is, if the current time exceeds the scheduled termination time, the job monitoring unit 36 fetches a divided job corresponding to the divided job name from the job information table 30, sets the schedule status corresponding to the fetched divided job to "FALSE" (S98), then returns to the processing in step S91, and repeats the processing from step S91 to S98.

In step S98, the job monitoring unit 36 sets the schedule status of a divided job in an unscheduled state among divided jobs, which become targets to be monitored, to "FALSE"

Figure 20:
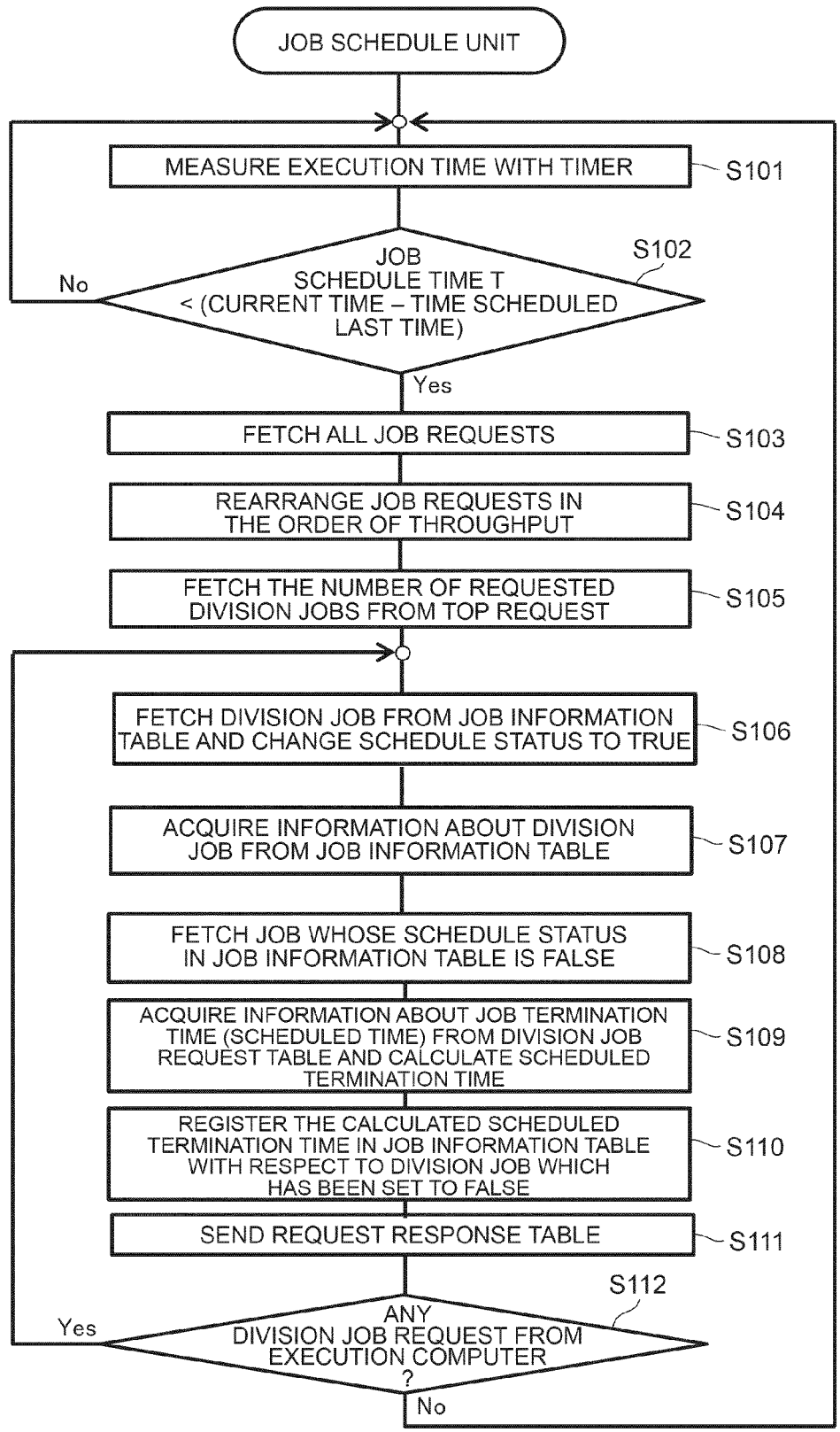
FIG. 20 is a flowchart for explaining processing of a job schedule unit.

Next, processing of the job schedule unit will be explained with reference to a flowchart in FIG. 20.

This processing is started by activation of the job schedule unit 38 by the CPU.

The job schedule unit 38 activates the timer, measures the activation time of the timer as execution time (S101) and judges whether job schedule time t is smaller than (current time—time which was scheduled last time) or not (S102).

If the job schedule unit 38 obtains a negative judgment result in step S102, that is, if the activation time of the timer does not reach the job schedule time t, the job schedule unit 38 returns to the processing in step S101 and repeats the processing from steps S101 and S102.

On the other hand, if the job schedule unit 38 obtains an affirmative judgment result in step S102, that is, if the activation time of the timer exceeds the job schedule time t, the job schedule unit 38 fetches all pieces of information registered in the divided job request table 64 sent from each execution computer (S103) and rearranges job requests of each execution computer in the order of throughput based on throughput values registered in the divided job request table 64 (S104).

Subsequently, the job schedule unit 38 fetches the number of requested divided jobs from the divided job request table 64 with the highest throughput value (S105).

Next, the job schedule unit 38 fetches a divided job corresponding to the divided job name from the job information table 30 and sets the schedule status corresponding to the fetched divided job from "RUN" to "TRUE" (S106).

Then, the job schedule unit 38 acquires information about the divided job corresponding to the divided job name from the job information table 30 (S107) and fetches a divided job, whose schedule status is "FALSE," among the acquired information (S108).

Subsequently, the job schedule unit 38 acquires scheduled time as information about termination time of the divided job from the divided job request table 64 and calculates scheduled termination time of the divided job based on the acquired scheduled time (S109).

Next, the job schedule unit 38 registers the calculated scheduled termination time in the job information table 30 with respect to the divided job whose schedule status is set to "FALSE" (S110).

Then, the job schedule unit 38 associates data of the divided job, whose schedule status is "FALSE," with the program and creates the request response table 62 for each execution computer and sends the content of the created request response table 62 to the job execution unit 50 for each execution computer (S111).

Subsequently, the job schedule unit 38 judges whether a divided job request is issued from each execution computer or not (S112); and if the job schedule unit 38 obtains an affirmative judgment result in step S112, that is, if the divided job request is issued from each execution computer, the job schedule unit 38 returns to step S106 and repeats the processing from step S106 to step S112.

On the other hand, if the job schedule unit 38 obtains a negative judgment result in step S112, that is, if the divided job request is not issued from each execution computer, the job schedule unit 38 returns to the processing in step S101 and repeats the processing from step S101 to step S112 to execute the next processing.

Under this circumstance, the job schedule unit 38 manages the scheduled termination time when the execution of the relevant divided job terminates at the execution computer, to which the divided job is assigned, and the schedule status indicating whether the divided job is assigned to each execution computer or not, by associating them with each other; and on condition that the job schedule unit 38 receives the divided job termination notice before the scheduled termination time from each execution computer 14, 16, 18, the job schedule unit 38 assigns a divided job, whose schedule status is an unassigned state (a divided job including divided data which is set to FALSE), to the execution computer which has sent the divided job termination notice.

Furthermore, if any execution computer incapable of sending the divided job termination notice before the scheduled termination time exists among the execution computers 14, 16, 18, the job schedule unit 38 can assign a divided job, which should be assigned to that execution computer, to the execution computer, which sent the divided job termination notice, before the scheduled termination time.

Next, processing for distributing a divided job to each execution computer will be explained with reference to FIG. 21.

When each execution computer 14, 16, 18 executes a divided job(s) every specified period of time (sec), each execution computer 14, 16, 18 requests the divided job(s) from the management computer 12 based on, for example, the multiplicity.

For example, in a case of the multiplicity of each execution computer 14, 16, 18 is 1 (numerical value within parentheses) as illustrated in FIG. 21, each execution computer 14, 16, 18 requests one divided job from the management computer 12 as a divided job scheduled to execute. In this case, the management computer 12 assigns one divided job to each execution computer 14, 16, 18, so that three divided jobs are distributed and assigned to the execution computers 14, 16, 18.

As a result, during first time, each execution computer 14, 16, 18 executes one divided job and, therefore, an accumulated total of the executed divided jobs becomes 3.

Regarding second execution time, the multiplicity of the execution computer 14 is 3 and the multiplicity of the execution computers 16, 18 is 2, so that the execution computers 14, 16, 18 request seven divided jobs from the management computer 12. In this case, the management computer 12 assigns three divided jobs to the execution computer 14 and assigns two divided jobs to each of the execution computers 16, 18. As a result, seven divided jobs are distributed and assigned to the execution computers 14, 16, 18.

Accordingly, during the second time, the execution computer 14 executes three divided jobs and each of the execution computers 16, 18 executes two divided jobs, so that an accumulated total of the executed divided jobs becomes 10.

Such processing is executed from the first time to the eleventh time; and if the execution computer 14 executes 54 divided jobs (1, 3, 4, 5, 5, 6, 6, 6, 6, 7, 5=54), the execution computer 16 executes 27 divided jobs (1, 2, 2, 2, 3, 3, 3, 3, 4, 4=27), and the execution computer 18 executes 19 divided jobs (1, 2, 2, 2, 2, 2, 2, 2, 2, 2=19), the accumulated total of the executed divided jobs becomes 100.

Specifically speaking, if the management computer 12 divides a grid job into 100 divided jobs, each execution computer 14, 16, 18 requests the divided jobs from the management computer 12 according to the multiplicity, the management computer 12 distributes and assigns the requested divided jobs to each execution computer 14, 16, 18, and each execution computer 14, 16, 18 executes the assigned divided jobs from the first time to the eleventh time, so that a total of 100 divided jobs can be executed.

Furthermore, during the eleventh execution time, the multiplicity of the execution computer 14 is 8, the multiplicity of the execution computer 16 is 4, and the multiplicity of the execution computer 18 is 3, so that the execution computers 14, 16, 18 request 15 divided jobs from the management computer 12.

Since the remaining number of divided jobs which should be processed in this case is 5, the management computer 12 assigns five divided jobs as the requested divided jobs to only the execution computer 14 whose multiplicity is 8 and which has the largest multiplicity. Specifically speaking, during the eleventh execution time, the management computer 12 assigns the divided jobs to only the execution computer 14 with the highest processing power. Incidentally, during the eleventh execution time, the management computer 12 may assign, for example, three divided jobs to the execution computer 14 and one divided job to each of the execution computers 16, 18.

Figure 22:
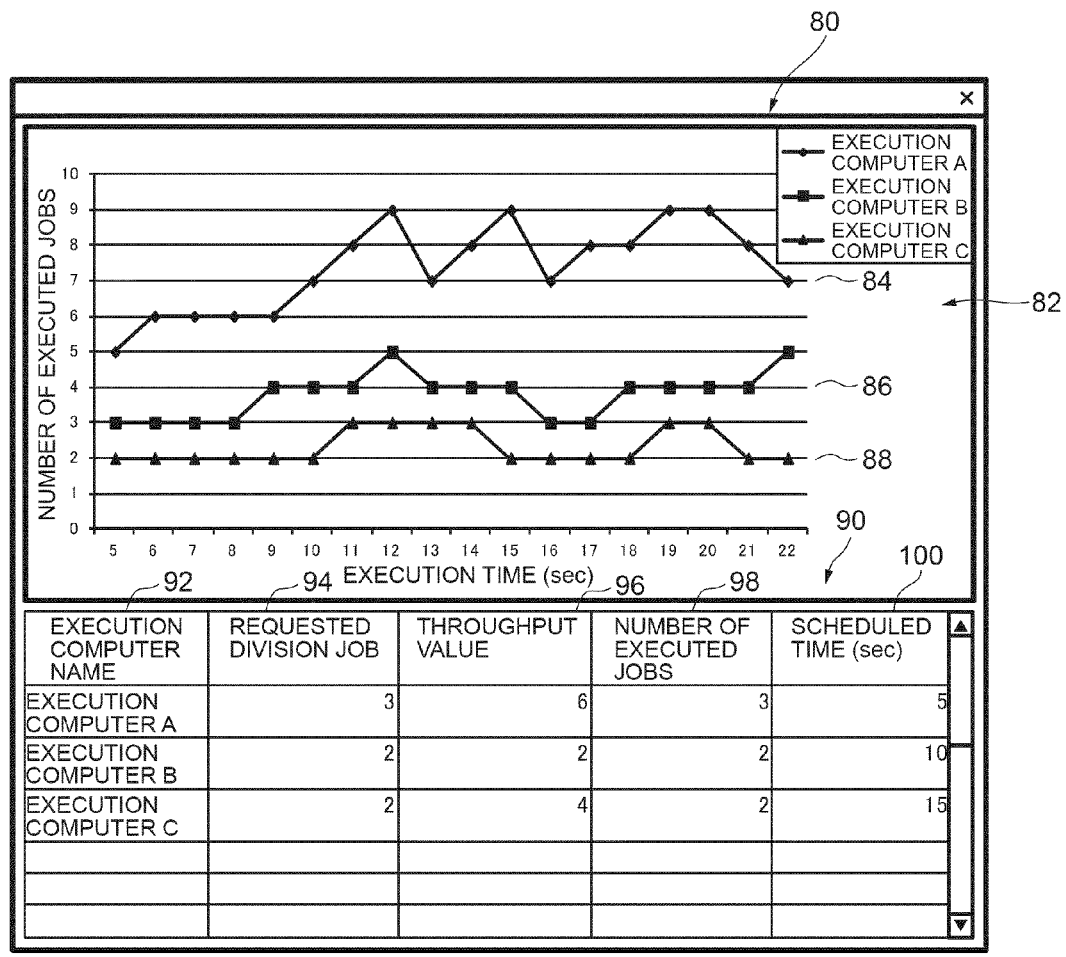
FIG. 22 is a diagram showing a display example for a monitor screen for the number of simultaneously executed jobs in each execution computer.

Next, FIG. 22 illustrates a display example for a monitor screen for monitoring the number of simultaneously executed jobs at each execution computer.

Referring to FIG. 22, a monitor screen 80 is configured as, for example, a display screen of an output device for each execution computer 14, 16, 18. The monitor screen 80 displays a graph 82 whose horizontal axis is execution time (sec) and whose vertical axis is the number of executed jobs, by associating it with the execution computers 14, 16, 18.

The graph 82 is composed of a graph 84 for the execution computer 14, a graph 86 for the execution computer 16, and a graph 88 for the execution computer 18.

Each gram 84, 86, 88 represents a transitional change of the number of executed jobs when the respective execution computers 14, 16, 18 execute jobs at the same time. Under this circumstance, the graphs 84, 86, 88 are displayed with different colors associated with the respective execution computers 14, 16, 18.

An execution status table 90 indicating the execution status of each execution computer 14, 16, 18 is displayed in a display area below the graph 82. The table 90 is constituted from an execution computer name 92, a requested divided job 94, a throughput value 96, the number of executed jobs 98, and scheduled time (sec) 100 and this execution status table 90 displays information of the execution status table 60.

The number of divided jobs requested from each execution computer 14, 16, 18 can be recognized and also the throughput value, the number of executed jobs, and the scheduled time (sec) can be recognized by checking the display content of the execution status table 90.

Moreover, the transitional change of the number of executed jobs by each execution computer 14, 16, 18 as well as the execution time (sec) can be recognized by checking the display content of the graphs 84 to 88.

According to this embodiment, the load on the management computer 12 can be reduced even when divided jobs are assigned simultaneously to each execution computer 14, 16, 18.

Moreover, according to this embodiment, the management computer 12 can assign more divided jobs to the execution computer whose number of requested divided jobs (the number of requested divided jobs) is large. As a result, it is possible to enhance the number of divided jobs to be processed by the entire computer system without having the load concentrated on the management computer 12.

Furthermore, the management computer 12 manages the execution time and the scheduled termination time of each divided job; and if the termination notice is not received from the execution computer, which executes a certain divided job, even after the scheduled termination time, the schedule status of the job information table 30 is set to FALSE and a divided job to be assigned to the execution computer, from which the termination notice has not received (the execution computer where a failure has occurred), is assigned to another execution computer. As a result, even if a failure occurs at any of the execution computers, the divided job can be executed with certainty by the execution computer in a normal state.

Incidentally, the present invention is not limited to the aforementioned embodiments and includes variations. For example, the functions of the management computer 12 can be added to any of the execution computers 14, 16, 18.

Furthermore, this embodiment has explained an example in which the management computer 12 and the execution computers 14, 16, 18 are used as physical computers; however, the present invention can be also applied to a configuration in which all or part of them is mounted as a virtual computer(s) on one or more physical computers.

Furthermore, it is also possible to display the monitor screen 80 on the output device for each execution computer 14, 16, 18, also display a monitor screen on an output device for the management computer 12, display a transitional change of the number of executed jobs in association with the execution time on this monitor screen, and display the content of the table 90 having, for example, the number of requested divided jobs and the throughput value.

Furthermore, part or all of the aforementioned configurations, functions, processing units, processing means, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

For example, a divided job processing program for having a management computer, which divides a job into a plurality of divided jobs and manages them (the management computer 12), and each object computer, among a plurality of object computers (the execution computers 14, 16, 18), for executing divided jobs, which are assigned by the management computer, among the plurality of divided jobs realize the following functions can be recorded as a program in a storage medium: a function that measures the load on each object computer, a function that generates a job request including information about the number of the divided jobs based on the measured bad; a function that sends the generated job request to the management computer, and a function that assigns the divided job(s) to each object computer according the received job request when the management computer receives the job request from each object computer.

REFERENCE SIGNS LIST

10 computer system, 12 management computer, 14, 16, 18 execution computers, 20 network, 30 job information table, 32 job input unit, 34 data division unit, 36 job monitoring unit, 38 job schedule unit, 40 execution status table, 42 computer information table, 44 job request unit, 46 multiplicity measurement unit, 48 load status measurement unit, 50 job execution unit, 60 execution status table, 62 request response table, and 64 divided job request table.

The invention claimed is:

1. A computer system comprising a management computer, among a plurality of computers, for dividing a job including data and a program for processing the data into a plurality of divided jobs and managing them, and a plurality of execution computers for executing divided jobs assigned by the management computer among the plurality of divided jobs,
   wherein each execution computer generates a job request including information about a number of the divided jobs based on a load on each execution computer and sends the generated jobs request to the management computer; and
   wherein when the management computer receives the ob request from each execution computer, it assigns a divided job to each execution computer according to the number of divided jobs included in the job request,
   wherein each execution computer measures a throughput value indicating the number of divided jobs, which can be processed per unit time, and a number of executed jobs indicating the number of divided jobs to be executed, respectively as the load for each load status observation time; decides multiplicity indicating the number of divided jobs, which can be executed simultaneously by each execution computer, based on the measured throughput value; calculates a difference between the decided multiplicity and a measured number of executed jobs; adds the calculated difference as a number of requested divided jobs to the job request; and sends the job request, to which the number of requested divided jobs is added, collectively to the management computer.

2. The computer system according to claim 1, wherein each execution computer: measures the throughput value for each load status observation time; decides latest multiplicity as a value increased from the multiplicity decided for previous load status observation time if the measured throughput value tends to increase from the throughput value measured at the previous load status observation time; and decides the latest multiplicity as a value decreased from the multiplicity decided for the previous load status observation time if the measured throughput value tends to decrease from the throughput value measured at the previous load status observation time.

3. The computer system according to claim 1, wherein each execution computer measures at least one of the following as the load: a throughput value indicating the number of divided jobs which can be processed per unit time by a CPU for executing processing on the divided jobs; a CPU activity ratio indicating an activity ratio of the CPU when executing processing on at least the divided jobs; a memory activity ratio indicating an activity ratio of a memory used by the CPU when executing the processing on the divided jobs; and an I/O activity ratio indicating an activity ratio of the CPU when executing data input/output processing.

4. The computer system according to claim 1, wherein each execution computer adds a latest throughput value, among the throughput value measured at each load status observation time, to the job request; and
   wherein the management computer decides an execution computer, to which the divided jobs are to be assigned, in descending order of the latest throughput value added to the job request.

5. The computer system according to claim 1, wherein the management computer assigns as many divided jobs as the number of requested divided jobs added to the job request to each execution computer.

6. A computer system comprising a management computer, among a plurality of computers, for dividing a job including data and a program for processing the data into a plurality of divided jobs and managing them, and a plurality of execution computers for executing divided jobs assigned by the management computer among the plurality of divided jobs,
   wherein each execution computer generates a job request including information about a number of the divided jobs based on a load on each execution computer and sends the generated job request to the management computer; and
   wherein when the management computer receives the job request from each execution computer, it assigns a divided job to each execution computer according to the number of divided jobs included in the job request,
   wherein when each execution computer terminates executing a divided job assigned from the management computer, it sends a termination notice of the divided job to the management computer; and
   wherein the management computer manages scheduled termination time when the execution computer to which the divided job is assigned terminates executing the divided job, and a schedule status, which indicating whether the divided job is assigned to any of the execution computers or not, by associating them with the divided job;
   wherein on condition that the management computer has received the termination notice of the divided job from each execution computer before the scheduled termination time, the management computer assigns a divided job, whose schedule status is indicated as unassigned, to the execution computer which has sent the termination notice of the divided job; and
   wherein if any execution computer incapable of sending the termination notice of the divided job before the scheduled termination time exists among any of the execution computers, the management computer assigns a divided job, which should be assigned to that execution computer, to the execution computer, which has sent the termination notice of the divided job, before the scheduled termination time.

7. The computer system according to claim 1, wherein during a process of executing divided jobs assigned from the management computer, each execution computer displays, on a monitor screen, a transitional change of the measured number of executed jobs in association with execution time to execute the divided jobs and also displays, on the monitor screen, the calculated number of requested divided jobs and the measured throughput value by associating them with each execution computer.

8. A divided job processing method for a computer system having a management computer, among a plurality of computers for dividing a job including data and a program for processing the data into a plurality of divided jobs and managing them, and a plurality of computers for executing divided jobs assigned by the management computer among the plurality of divided jobs, the divided job processing method comprising;

a generation step executed by each execution computer generating a job request including information about a number of the divided jobs based on a load on each execution computer;

a transmission step executed by each execution computer sending the generated job request to the management computer; and an assignment step executed by the management computer, upon receipt of the job request from each execution computer, assigning a divided job to each execution computer according to the received job request, wherein in the generation step, each execution computer measures a throughput value indicating the number of divided jobs, which can be processed per unit time, and a number of executed jobs indicating the number of divided jobs to be executed, respectively as the load for each load status observation time; decides multiplicity indicating the number of divided jobs, which can be executed simultaneously by each execution computer, based on the measured throughput value and calculates a difference between the decided multiplicity and a measured number of executed jobs; adds the calculated difference as a number of requested divided jobs to the job request; and wherein in the transmission step, each execution computer sends the job request, to which the number of requested divided jobs is added, collectively to the management computer.

9. The divided job processing method according to claim 8, wherein in the generation step, each execution computer: measures the throughput value for each load status observation time; decides latest multiplicity as a value increased from the multiplicity decided for previous load status observation time if the measured throughput value tends to increase from the throughput value measured at the previous load status observation time; and decides the latest multiplicity as a value decreased from the multiplicity decided for the previous load status observation time if the measured throughput value tends to decrease from the throughput value measured at the previous load status observation time.

10. The divided job processing method according to claim 8, wherein in the generation step, each execution computer measures at least one of the following as the load: a throughput value indicating the number of divided jobs which can be processed per unit time by a CPU for executing processing on the divided jobs; a CPU activity ratio indicating an activity ratio of the CPU when executing processing on at least the divided jobs; a memory activity ratio indicating an activity ratio of a memory used by the CPU when executing the processing on the divided jobs; and an I/O activity ratio indicating an activity ratio of the CPU when executing data input/output processing.

11. The divided job processing method according to claim 8, wherein in the generation step, each execution computer adds a latest throughput value, among the throughput value measured at each load status observation time, to the job request; and wherein in the assignment step, the management computer decides an execution computer, to which the divided jobs are to be assigned, in descending order of the latest throughput value added to the job request.

12. The divided job processing method according to claim 8, wherein in the assignment step, the management computer assigns as many divided jobs as the number of requested divided jobs added to the job request to each execution computer.

13. The divided job processing method according to claim 8, further comprising a step executed by each execution computer, during a process of executing divided jobs assigned from the management computer, displaying, on a monitor screen, a transitional change of the measured number of executed jobs in association with execution time to execute the divided jobs and also displaying, on the monitor screen, the calculated number of requested divided jobs and the measured throughput value by associating them with each execution computer.

* * * * *